United States Patent
Kralis et al.

(10) Patent No.: US 12,458,989 B2
(45) Date of Patent: Nov. 4, 2025

(54) SYSTEM AND METHOD FOR DISTRIBUTING ROSIN AND OTHER VISCOUS MATERIALS

(71) Applicants: Konstantine Pericles Kralis, Skokie, IL (US); Alberto Adarve Lozano, Madrid (ES)

(72) Inventors: Konstantine Pericles Kralis, Skokie, IL (US); Alberto Adarve Lozano, Madrid (ES)

(*) Notice: Subject to any disclaimer, the term of this patent is extended or adjusted under 35 U.S.C. 154(b) by 376 days.

(21) Appl. No.: 18/109,994

(22) Filed: Feb. 15, 2023

(65) Prior Publication Data
US 2023/0264215 A1 Aug. 24, 2023

Related U.S. Application Data

(60) Provisional application No. 63/311,826, filed on Feb. 18, 2022.

(51) Int. Cl.
*A24F 47/00* (2020.01)
*B05B 11/00* (2023.01)
(Continued)

(52) U.S. Cl.
CPC ...... *B05B 11/0035* (2013.01); *B05B 11/0002* (2013.01); *B05B 11/0054* (2013.01); *B05B 11/02* (2013.01); *A23L 33/105* (2016.08); *A24F 47/00* (2013.01); *A61J 7/0053* (2013.01); *A61J 2200/42* (2013.01); *A61J 2200/70* (2013.01);
(Continued)

(58) Field of Classification Search
CPC ...................................................... A24F 47/00
See application file for complete search history.

(56) References Cited

U.S. PATENT DOCUMENTS

| | | | | |
|---|---|---|---|---|
| 7,086,796 B2 * | 8/2006 | Severa | ............... | A61M 35/003 401/179 |
| 10,329,075 B2 | 6/2019 | Gershoni et al. | | |

(Continued)

FOREIGN PATENT DOCUMENTS

| | | |
|---|---|---|
| EP | 0327910 | 8/1989 |
| WO | WO99/02210 | 1/1999 |
| WO | WO2021/005611 | 1/2021 |

OTHER PUBLICATIONS

PCT International Search Report and Written Opinion for International Application No. PCT/EP2023/053813, Date of Mailing: May 17, 2023.

(Continued)

*Primary Examiner* — Russell E Sparks
(74) *Attorney, Agent, or Firm* — The Law Offices of Lisa & Lesko, LLC; Justin Lesko, Esq.

(57) ABSTRACT

Systems, devices, and methods are disclosed for pen that distributes viscous plant material, such as rosin, from a cartridge. The pen receives, from a button, input corresponding to a first control instruction. The pen has a motor configured to receive the first control instruction from the controller and, in response, drive a spindle that linearly displaces a plunger, wherein the linear displacement of the plunger causes plant material to be pushed out of a nozzle of the pen. The pen cartridge includes a rubber plug configured to be linearly displaced by the plunger to cause rosin to be disturbed from the cartridge.

18 Claims, 13 Drawing Sheets

(51) Int. Cl.
*B05B 11/02* (2023.01)
*A23L 33/105* (2016.01)
*A61J 7/00* (2006.01)
(52) U.S. Cl.
CPC ........ *A61J 2205/60* (2013.01); *A61J 2205/70* (2013.01)

(56) References Cited

U.S. PATENT DOCUMENTS

| | | | |
|---|---|---|---|
| 2014/0041655 A1* | 2/2014 | Barron | A24F 40/46 |
| | | | 128/202.21 |
| 2020/0022416 A1 | 1/2020 | Alarcon | |
| 2020/0120989 A1 | 4/2020 | Danek | |
| 2021/0015153 A1 | 1/2021 | Raichman | |

OTHER PUBLICATIONS

Norditropin Pen Chinese Manual, CHOFN Intellectual Property Service Co., Ltd. (2018).

* cited by examiner

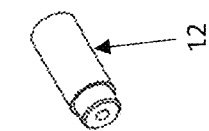
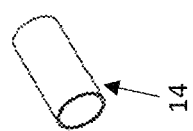
Fig. 6
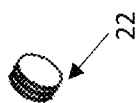
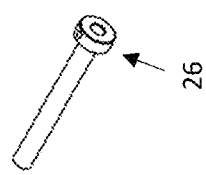
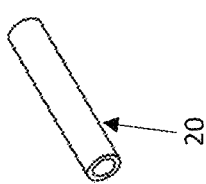
Fig. 5

SYSTEM AND METHOD FOR DISTRIBUTING ROSIN AND OTHER VISCOUS MATERIALS

CROSS REFERENCE TO RELATED APPLICATIONS

This application claims the benefit of Provisional Application No. 63/311,826 filed on Feb. 18, 2022, which is hereby incorporated by reference in its entirety.

BACKGROUND OF THE INVENTION

This application relates to and describes an improved system and method for distributing rosin, plant-based oils, plant-extracted concentrates, and other viscous materials responsive to heat. The system and method can also be applied to water-soluble products. Use of extracted rosin and extracted plant-based oils has recently become popular in connection with marijuana/*cannabis*, but other plant-based materials can also be extracted as rosin or oil. For example, rosin can be obtained from the oleoresin or deadwood of pine trees or from tall oil, and the oils extracted from that process can be used for making varnish. See https://www.merriam-webster.com/dictionary/rosin. Rosin can be a translucent, sappy material (sometimes referred to as "shatter"), an oil-like substance, a budder or batter (more like a solid), or a wax-like material. The consistency of the rosin depends on the starting material and the details of the particular process used to extract the rosin, among other factors. The present invention is applicable to any type of rosin or plant-based oil capable of being stored in the pen described herein.

The devices and applications disclosed herein are described in the context of *cannabis* rosin and *cannabis* oil, although their applicability to rosin, plant-extracted concentrates, oils derived from other plants, and other viscous materials responsive to heat will be apparent to those of ordinary skill in the art.

SUMMARY OF THE INVENTION

Aspects and applications of the systems, methods, and devices presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of post-AIA 35 U.S.C. § 112(f). Thus, the use of the words "function," "means" or "step" in the Detailed Description or Description of the Drawings or claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of post-AIA 35 U.S.C. § 112(f). Moreover, even if the provisions of post-AIA 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The aspects, features, and advantages will be apparent to those artisans of ordinary skill in the art from the DETAILED DESCRIPTION and DRAWINGS, and from the CLAIMS. The use of the words "embodiment" and "object" in the specification is merely a convenience and not intended to indicate that certain features (or objects) of the invention are limited to only certain forms or examples (or embodiments) of the invention, and is not intended to correlate any claimed feature or object to any one form or embodiment of the invention either alone or in combination with other features, objects, forms, examples, or embodiments. However, without attempting to characterize or limit the scope of inventions as they are described and claimed, some of the advantages of the various features of the systems, methods, and devices are summarized below.

It is an object of the invention to provide a user-friendly, portable pen for heating and distributing viscous materials.

It is yet another (and optionally independent) object of the invention to provide a color-coded pen and cartridge system for more easily reading information about pen cartridges and sharing that information with a user.

It is yet another (and optionally independent) object of the invention to provide an RFID pen and cartridge system for more easily reading information about pen cartridges and sharing that information with a user.

In one exemplary form, a pen for distributing a plant material, is provided that includes a controller (such as a microcontroller, processor, microprocessor, system on a chip, or other known programmable controller hardware) configured to receive, from a button, input corresponding to a first control instruction, and a motor configured to receive the first control instruction from the controller and, in response, drive a spindle that linearly displaces a plunger, wherein the linear displacement of the plunger is configured to cause plant material to be pushed out of a nozzle of the pen.

In one exemplary form, a pen for distributing a plant material includes a heater configured to receive a control instruction from a controller and, in response, engage heating elements operable to heat the plant material.

In one exemplary form, a pen has RFID reader configured to read an RFID chip of a cartridge to obtain information relating to the contents of the cartridge.

In one exemplary form, a pen has a display configured to display the information relating to the contents of the cartridge.

In one exemplary form, a pen has a color sensor configured to sense a color of a cartridge and provide the color to a controller of the pen. The controller can be configured to send a control instruction to a heater based on the color.

In one exemplary form, a pen has a display coupled to the controller and configured to display operational instructions for the pen In one exemplary form, a pen has a charging port for charging the pen.

In one exemplary form, a pen cartridge containing rosin or other plant material or viscous material includes a rubber plug configured to be linearly displaced by a plunger to cause plant material to be disturbed from the cartridge and an RFID chip on the cartridge that stores information about the stored material. The pen cartridge may also be labeled with a color that indicates information about the cartridge to a color reader of a pen.

In one exemplary form, a pen performs one or more of the following steps: the pen displays on its display information corresponding to a number of button clicks required to engage a heater; receives by a controller, via a button of the pen, the number of button clicks required to engage the heater, and in response, engages the heater to heat the plant material; displays on the display information indicating that heating is complete; receives by the controller, via the button of the pen, a number of button clicks required to cause the plant material to be distributed, and in response the controller drives a spindle with a motor to linearly displace a plunger, wherein the linear displacement of the plunger causes the plant material to be pushed out of a nozzle of the pen.

In one exemplary form, the pen reads information from a cartridge with an RFID reader of the pen, wherein the information from the cartridge indicates to the pen controller that plant material stored in the cartridge must be heated prior to being distributed from the pen.

In one exemplary form, the pen reads information from a cartridge with an RFID reader of the pen, wherein the information from the cartridge includes a profile for the plant material stored in the cartridge.

In one exemplary form, the pen senses a temperature within the pen and regulates the heater in response to the sensed temperature.

In one exemplary form, the pen displays a warning on the display relating to the temperature of the pen.

In one exemplary form, the pen senses a current increase in the motor that indicates a cartridge inside of the pen is empty, and in response, a controller of the pen causes the motor to reverse its direction.

In one exemplary form, a pen displays on its display information indicating that the cartridge is empty.

In one exemplary form, a pen provides an audio indication, via a speaker, that the cartridge is empty.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 5 depicts an isometric view of exemplary embodiments of the plunger, spindle, and piston.

FIG. 6 depicts an isometric view of exemplary embodiments of the heat sink and cartridge.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
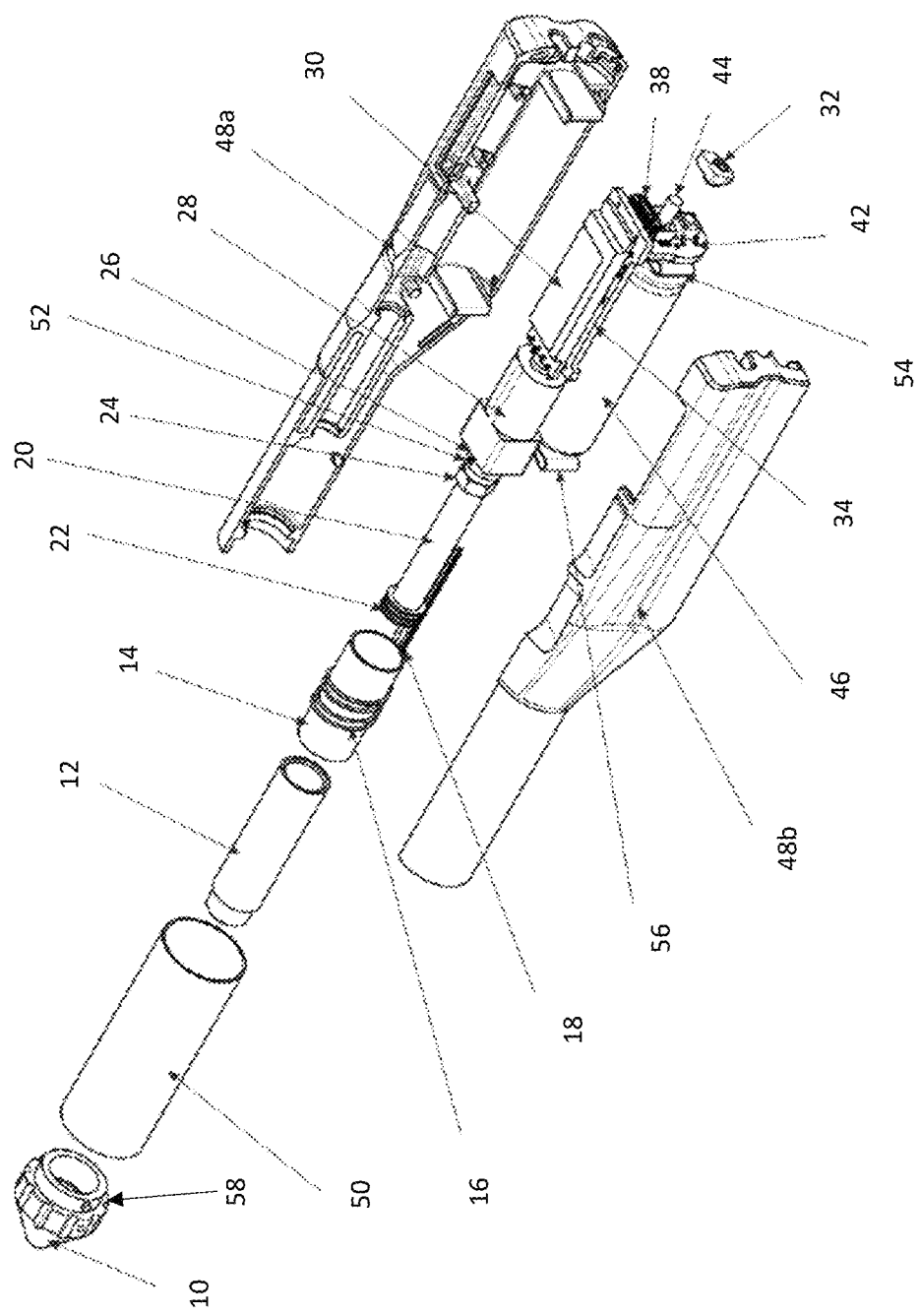
FIG. 1 depicts an exploded isometric view of one embodiment of the pen.
Figure 2:
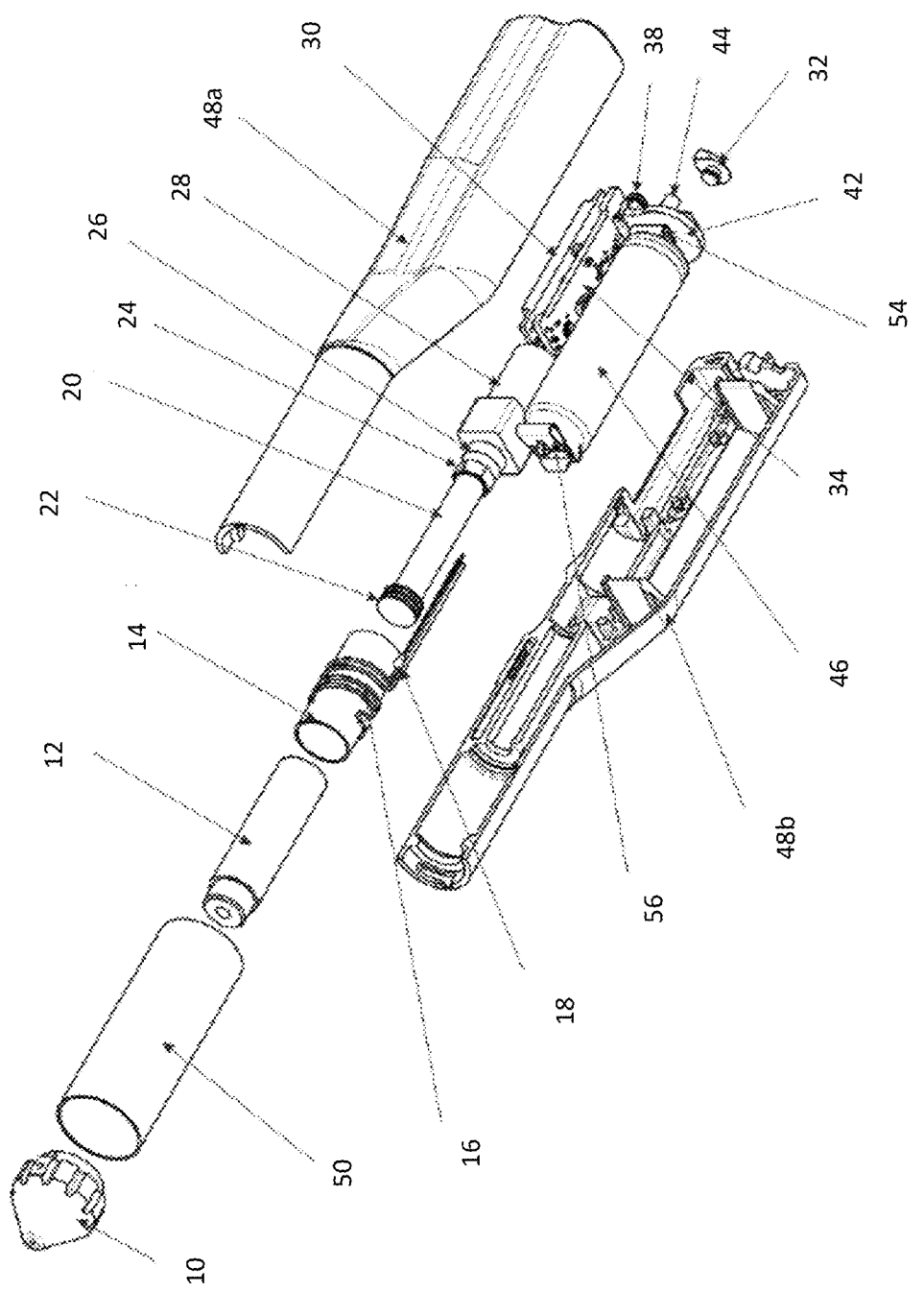
FIG. 2 depicts an exploded isometric view of an exemplary embodiment of the pen.
Figure 3:
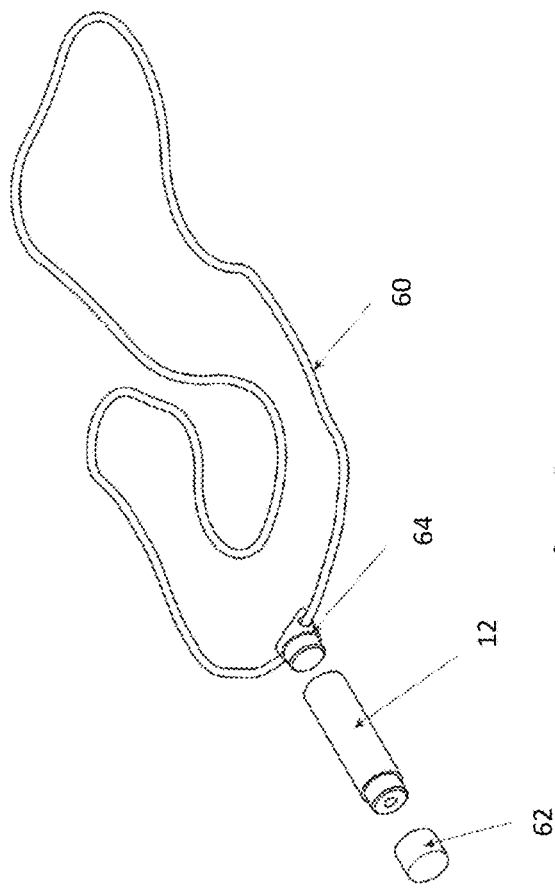
FIG. 3 depicts an exploded isometric view of one embodiment of the cartridge lanyard.
Figure 4:
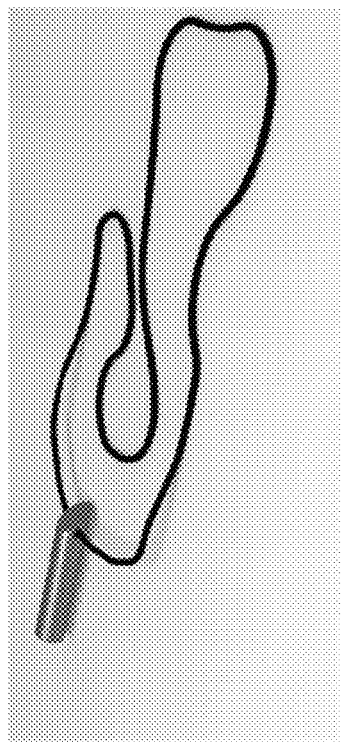
FIG. 4 an isometric view of the assembled cartridge lanyard shown in FIG. 3.
Figure 7:
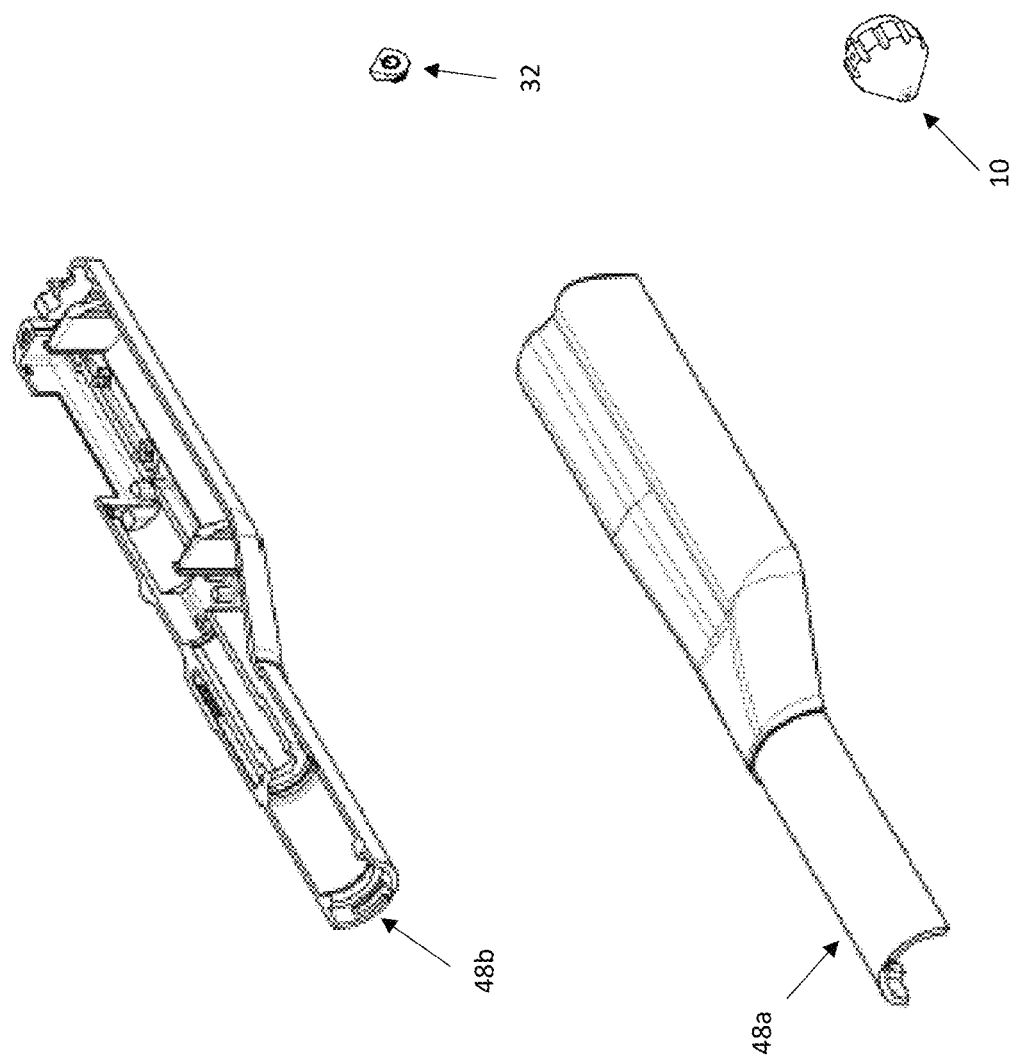
FIG. 7 depicts an isometric view of exemplary embodiments of the nozzle, button, and case.
Figure 8:
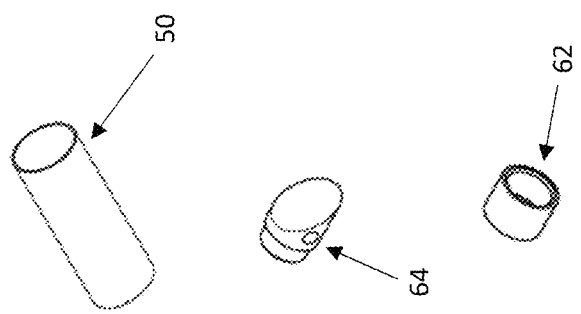
FIG. 8 depicts an isometric view of exemplary embodiments of the outer envelope, lower cap, and upper cap.
Figure 9:
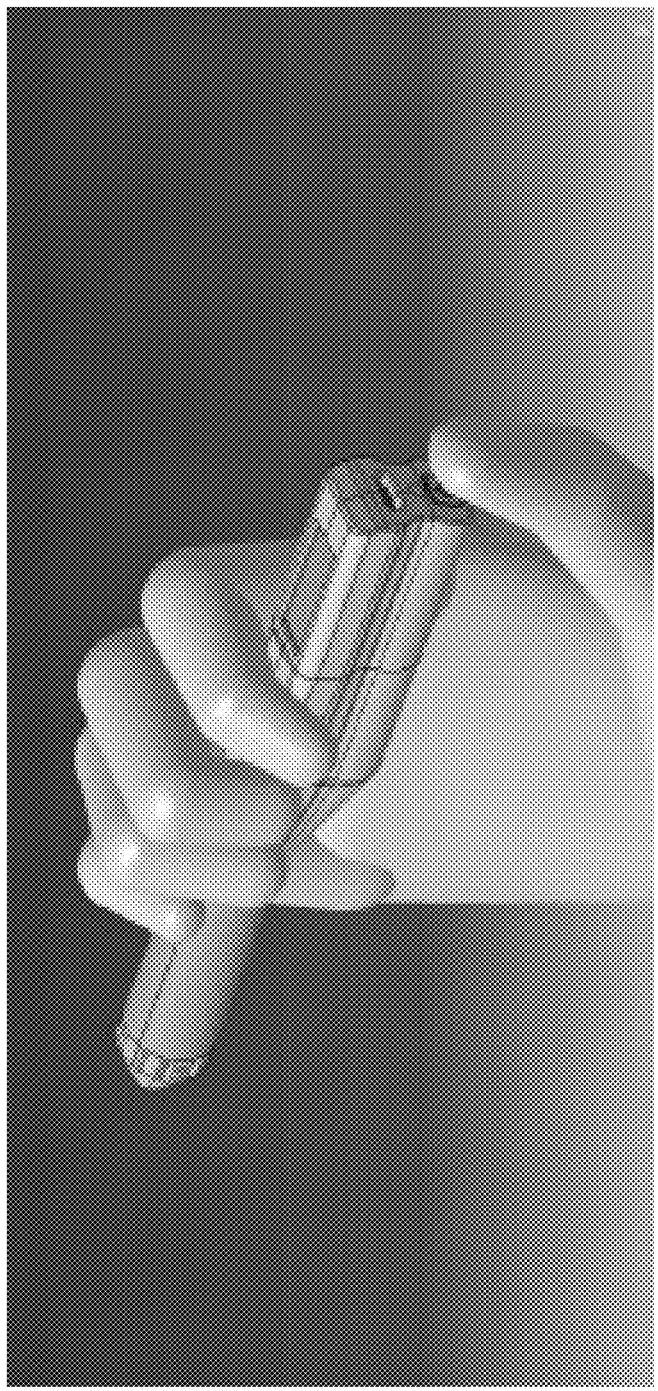
FIG. 9 depicts an exemplary embodiment of the pen in a user's hand.
Figure 10:
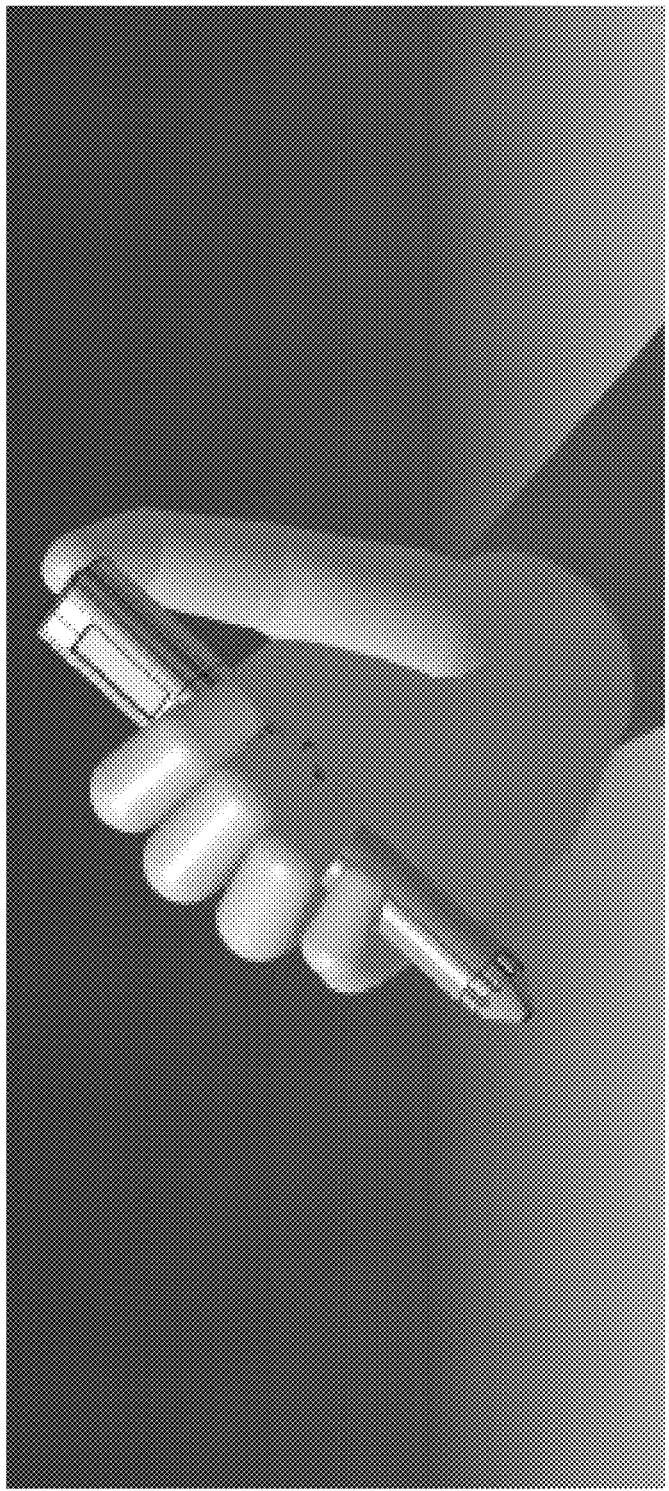
FIG. 10 depicts an exemplary embodiment of the pen in a user's hand.
Figure 12:
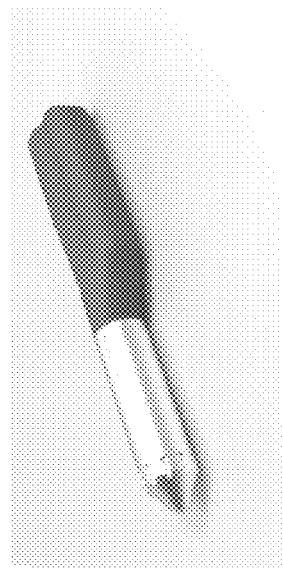
FIGS. 12-15 depict an exemplary embodiment of the assembled pen.
Figure 11:
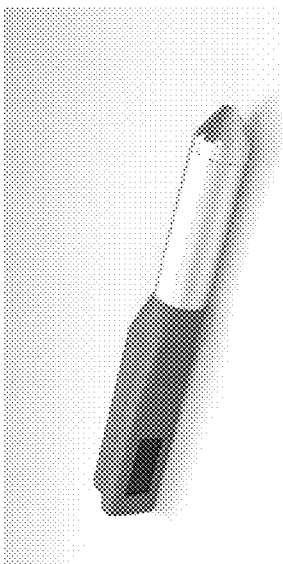
FIG. 11 depicts a back view of the first embodiment of the lower platen with a gutter rail collection system.
Figure 14:
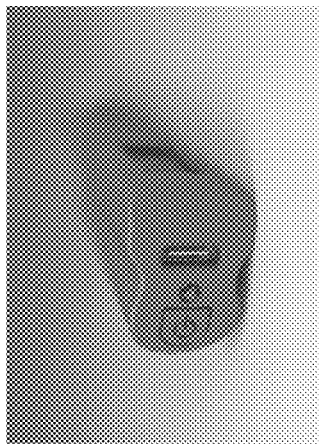
Figure 13:
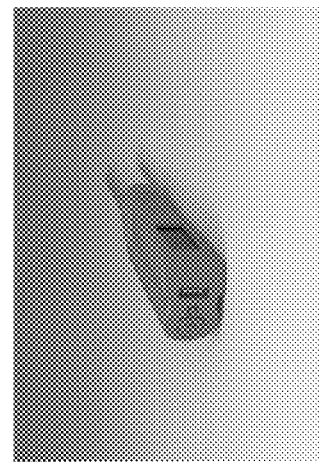
Figure 15:
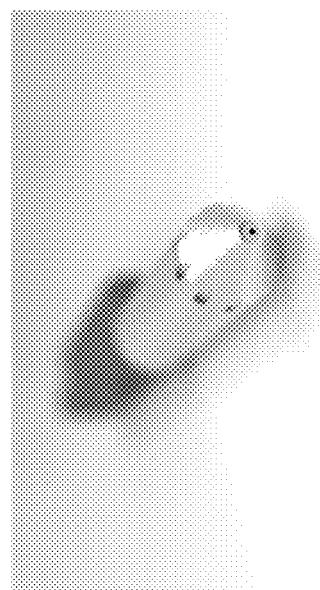
Figure 16:
FIG. 16 depicts an isometric view of an exemplary embodiment of the assembled pen with one side of the body removed to show the internal components.
Figure 17:
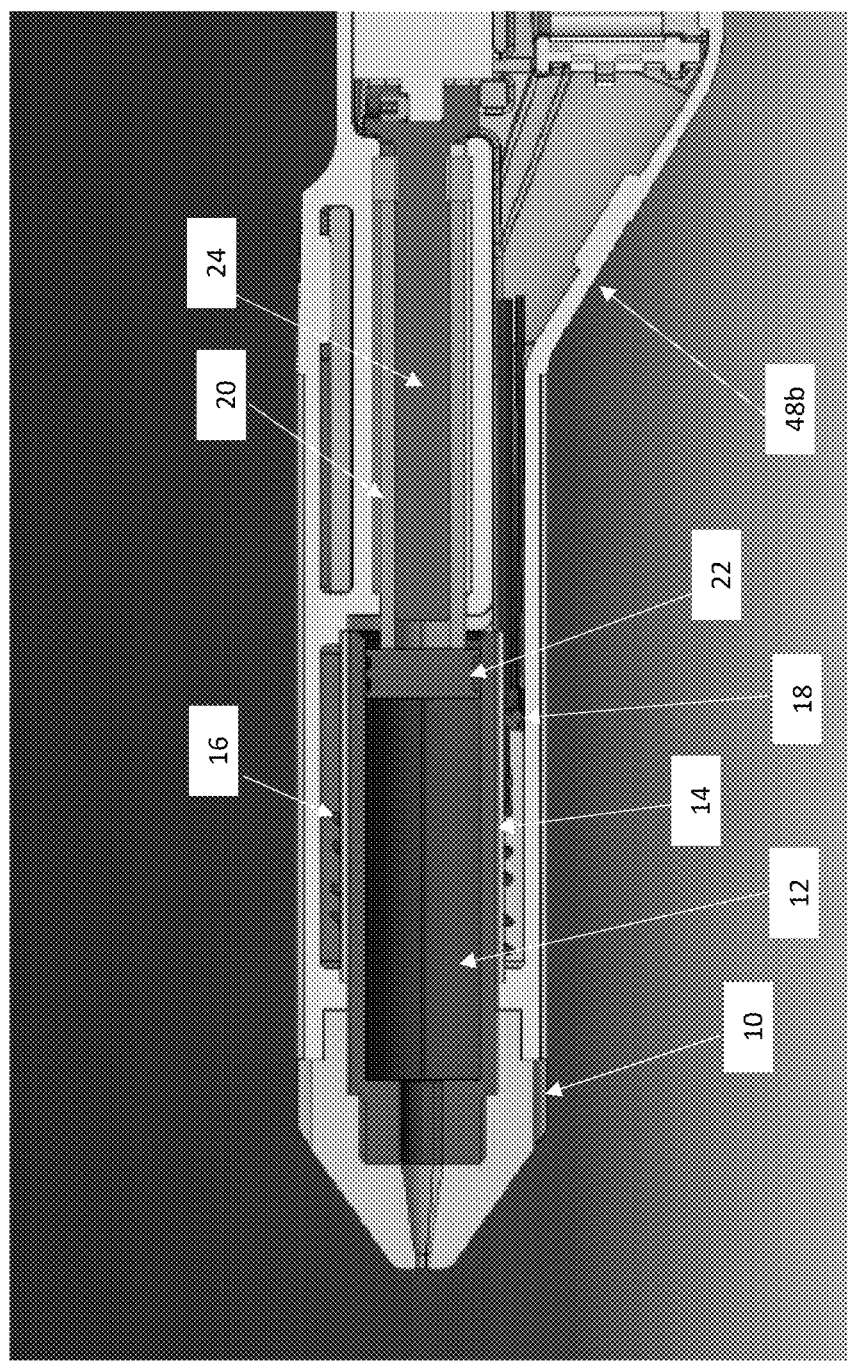
FIG. 17 depicts an cross-sectional view of part of an exemplary embodiment of the pen, showing the tip, cartridge, heater, heat sensor, piston, spindle, and other components.
Figure 19:
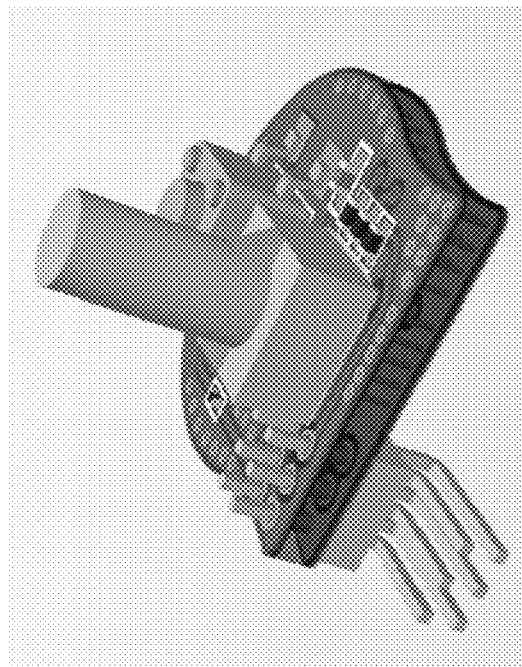
FIG. 19 depicts an isometric view of an exemplary embodiment of the button PCB Board.
Figure 18:
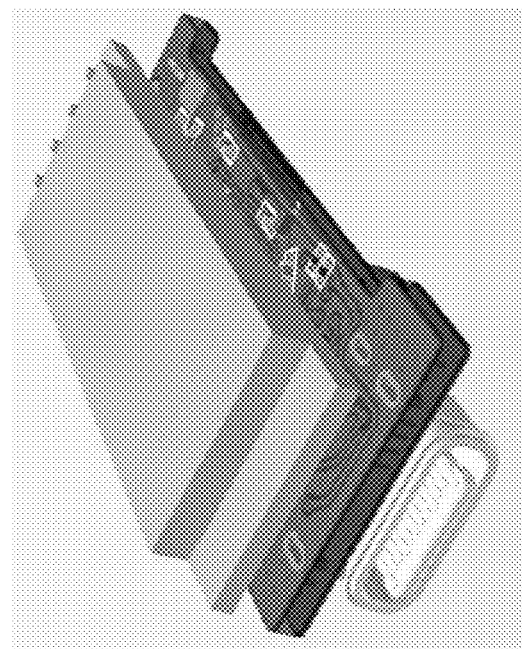
FIG. 18 depicts an isometric view of an exemplary embodiment of the main PCB Board.
Figure 22:
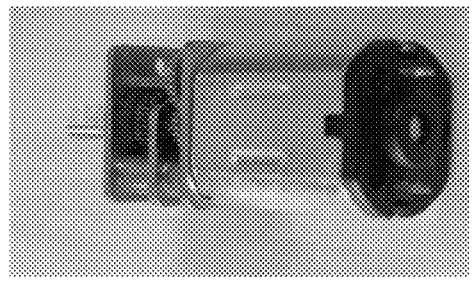
FIGS. 20-22 depict isometric views of an exemplary embodiment of the motor.
Figure 21:
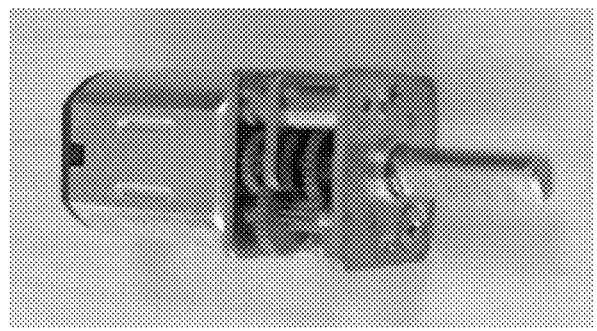
Figure 20:
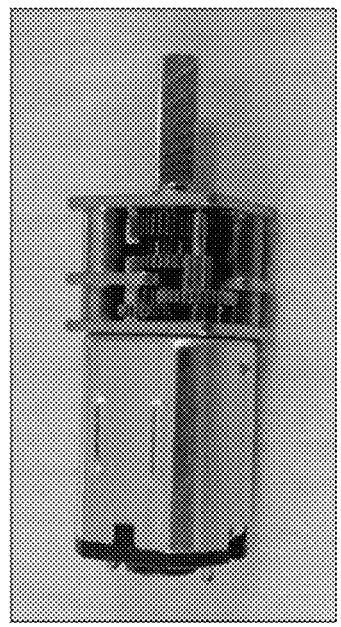

The system and method described herein relates to an electromechanical pen for storing, heating, and distributing rosin, oil, or other viscous materials. As shown in FIGS. 1 and 2, the pen includes: a nozzle 10 for distributing discharged material, a cartridge 12 that stores the material (also referred to herein as "product") to be distributed, a heat sink 14 and heater 16 (including a temperature sensor 18) surrounding the cartridge 12 and used to heat the cartridge/material, a plunger 20 with a piston 22 used to push material out of the cartridge 12 and nozzle 10, a nut 24 in contact with the plunger 20 and used to push the plunger, a spindle 26 driven by a motor 28 that transforms the motor's rotation into linear displacement of the nut 24 (thereby pushing the plunger 20), an OLED display 30, and a button 32 that receives user input. The pen includes a total of two PCB control boards: 1) a main PCB board 34 that is connected to the microcontroller (MCU), a battery charger 38 (USB Type C charger, in the example), a voltage regulator, and the OLED display 30; and 2) a button PCB board 42 that contains the button 32 and an LED indicator 44. The button PCB board 42 is connected to the main PCB board 34. A 3.7 Volt rechargeable lithium battery 46 powers the motor 28, MCU 36, OLED display 30, LED indicator 44, and any other electronic components.

A two piece case (48a and 48b) and outer envelope 50 are used to house most of the components. In the configuration shown in the figures, the button, LED indicator, and charging connector are located on the end of the pen that is opposite the nozzle, and the OLED display is also near that end.

As shown in FIGS. 1 and 2, hexagonal socket set screw 52 connects the spindle 26 to the motor 28. In the example shown in the figures, the positive battery terminal 54 and negative battery terminal 56 are arranged as shown. In some implementations, the battery is removeable and can be replaced manually by the user with a new battery, which allows the user to circumvent the need for battery charging.

The nozzle 10 includes a mechanism 58 to unscrew and remove the nozzle so that the user can insert a cartridge into the pen or remove a cartridge from the pen.

The cartridges typically include a rubber plug on the end of the cartridge that is in contact with the plunger so that cartridges can be carried around by a user without any material leaking. The system allows user to easily swap out the material being distributed according to the user's tastes. For example, the material in each cartridge has a specific flavor profile, potency (of THC and/or CBD, for example), viscosity, plant profile, etc., and the user chooses the desired profile for a specific occasion or scenario.

In some implementations, the OLED display 30 is a touchscreen for controlling the pen, which could eliminate the need for some of the button controls that would be carried out on the touchscreen instead.

The LED indicator 44 provides various flash scenarios that are meaningful to the user: for example, when the pen is on, the LED indicator 44 is lit. When the pen is charging, the LED indicator 44 is also lit with various indicators—for example, when the battery is charging, the LED indicator 44 might be red (or flashing green), and when the battery is fully charged, the LED indicator 44 might be green.

In one exemplary control scenario, a user presses the button 32 a specific number of times (for example, 1, 3, or 5 times) to turn on the pen, which also causes the OLED screen 30 to provide a visual indicator to the user such as "On" or "Ready." If heating is required for the material in the cartridge (because it is hard or too viscous at room temperature), the OLED screen 30 might say "Heating Required" or provide some similar indicator to the user, and then the user presses the button 32 a certain number of times (for example, three times) to engage the heater 16. As another example, the OLED screen 30 might say "PRESS BUTTON 3 TIME STO HEAT," thereby providing instructions for the user on how to engage the heater. The OLED screen can provide similar instructions for other procedures described herein. While the pen is heating, the OLED 30 may display "STAND BY" or "HEATING" or other such indicators to the user. When the cartridge reaches a desired temperature, the OLED display 30 may indicate to the user that the pen is "READY" for material to be distributed. For some applications, heating the material is unnecessary, and the material is pushed out of the nozzle at room temperature. In those applications, the heating steps are not required, and the OLED display 30 might just display "READY" soon after the pen is turned on. In either case, when the material is ready for distribution, the user pushes the button 32 to distribute drops of materials from the nozzle 10—each press of the button 32 corresponds to a specific movement of the motor 28, which causes a specific amount of material to be pushed out of the nozzle 10. For example, a single press of the button 32 may correspond to distribution from the nozzle 10 of a single "drop" of material by volume. The size of such "drops" will depend on the turn of the motor 28-a more complete turn (or more than one turn) will result in a greater amount of material being distributed. The turn of the motor 28 that corresponds to a single button 32 push can be calibrated for various applications and give the user control over the desired dose. For example, if a user knows the potency of the material being distributed, a user will choose a specific number of button 32 clicks to reach a desired "dose" of the product being distributed. For example, each button click might correspond to a specific "dose" of THC or CBD (or both) being distributed from the nozzle 10 of the pen. In some embodiments, the OLED 30 will display the dose (or volume of material) being distributed each time the button is pressed. When the user is done distributing drops, the user will press the button 32 a specified number of times to turn off the pen.

In some implementations, the pen has an automatic shut-off feature that will engage if the user waits too long to complete one or more of the steps listed above, to conserve battery. For example, if the user turns the pen on but does nothing else for a specified amount of time (for example, 5, 10, or 20 seconds), the pen will shut off. As another example, if the user does not actually distribute any drops within a specified time period of time after heating, the pen will shut off. In short, the pen can be programmed to automatically shut off after a specified period of user inactivity.

In some implementations, the pen includes a speaker system that provides audio indicators to the user in addition to (or instead of) any of the visual indicators on the OLED screen or LED indicator described herein. For, example, the audio indicators might correspond to the words described herein as being shown on the OLED display (or they can be other words), or the audio indicators can be other sounds, such as a beep or a sequence of "beeps" having a specific meaning for the user. For example, when the pen is turned on, the provided audio indicator can be a single beep or specific word such as "On," "Pen Engaged," or other words to indicate to the user that the power is on. The speaker system can also provide audio indicators corresponding to information regarding the cartridge obtained via the RFID reader, color sensor, or other methods, as described further below. For example, the audio indicator provided by the speaker can call out various attributes such as "The Cartridge contains 750 mg of Sour Diesel Extract," "The Cartridge contains 75 drops at 10 mg per drop" and the like. Appropriate hardware and control systems for the speaker system are known in the art, and the MCU can be used for control of the speaker system.

In some implementations, the pen has an additional color sensor (internal or external, using known, existing color sensors) that is used to sense the color of the cartridge (or a color on the cartridge), which enables the pen (for example, using the MCU) to automatically determine appropriate heat settings for the specific cartridge that is being used with the pen. In such implementations, cartridges are color-coded according to the material they store. For example, a cartridge storing material that is hard (for example, material that would be considered "shatter") at room temperature and requires high heating (such as 90 degrees Celsius or more) would be red, whereas a cartridge storing liquid material with low viscosity that does not require any heating would be gray. A cartridge that requires some heating (but low heat, such as 60 degrees Celsius or less, which is appropriate for direct oral consumption) might be blue, and a cartridge that requires a medium level of heat might be yellow or orange. The specific color schemes can vary, but the point is that the color effectively provides "instructions" for the pen and heater. The color of the cartridge is sensed by the color sensor at some point prior to the heater being engaged. As an alternative, the user manually inputs the desired temperature for the cartridge/heater using button clicks or other inputs described herein. Also, the time period for the automated shut off feature can be temperature-dependent in some implementations—for example, a short "shut off" time for hot applications, and a longer "shut off" time for cooler applications.

Many applications exist for the precise dosing pen distribution system described herein, including direct oral dosing (medical or recreational) into a user's mouth, dosing product for vapor inhalation of heated drops (commonly referred to as "dabbing"), adding drops to edible foods or drinks (in a commercial or recreational setting), adding drops to *cannabis* or other products that are smoked (such as a joint or a glass receptacle filled with *cannabis*), or combining the product with other products in tinctures.

During dosing, the tip of the pen can be held directly over a user's mouth, so that when the button is clicked the dose lands on a user's tongue (or under a user's tongue) and is ingested directly. In the alternative, in cooking or baking processes that call for THC, CBD, plant-extracted concentrate, or other rosin/oils, the pen can be held over the pan, the mixing bowl, the food product, etc. and then the button pressed so that the material is distributed from the pen to the food product. The pen can be used for "dosing" drinks as well. This is a simple and accurate way to distribute a desired amount of rosin, plant-extracted concentrate, or oil (and correspondingly, a desired amount of THC or CBD)—for example, the button is pressed multiple times in a row until the desired amount of material is distributed.

In some cases, the product maybe too hot (such as hotter than 60 Celsius) for direct oral consumption from the tip of the pen. In such cases, the OLED display, LED indicator, and/or the speaker system can be configured to provide warning messages to the user, such as flashing or red lights, loud sounds, specific words (for example, "TOO HOT FOR ORAL CONSUMPTION"), etc. As an additional safety measure, the system can instruct the user to press and hold the button for a specified amount of time to confirm that the user has received these warning messages.

When the plunger reaches the end of the cartridge and the cartridge is empty, the plunger will effectively be pushing against the end of the cartridge. As a result of this resistance from the end of the cartridge, the current carried through the motor will rise when the motor is engaged, which is a signal to this system and MCU that the cartridge is empty. Based on that signal, the MCU will instruct the motor to reverse operations to fully retract the plunger back to its initial position. During such processes, the OLED may display one or more indicators to the user such as "Reversing," "Resetting," "Empty," "Cartridge Empty," or the like.

Similarly, if the material inside the cartridge becomes too hard or is too viscous for distribution (for example, because the heater has failed or is not hot enough), the resistance from pushing against the material will cause the current carried through the motor to rise when engaged, and based on that signal, the MCU will instruct the motor to reverse operations to fully retract the plunger back to its initial position. Again, during such processes, the OLED may display one or more indicators to the user such as "Reversing," "Resetting," "Error" or the like.

In some implementations, the OLED display is unnecessary, and the LED indicator is instead used to show the "READY" status of the pen (after heating is complete) by providing specific signals (for example, flashing at certain intervals) or colors to the user.

The desired temperature of the material for distribution will depend on the viscosity and other properties of the material being distributed. In some embodiments, the temperature for the heater is adjustable, and the user sets the temperature using button clicks, a touchscreen, or other known methods. For some applications, heating is unnecessary, and the material is pushed out of the nozzle at room temperature. However, the built-in heater does solve a common problem in the industry with viscous plant oils in that the material can be stored as a thick (or even hard) substance but then heated so that it is "thinner' (or "looser") for distribution. In some implementations, insulations is wrapped around the heater to more allow it to more efficiently heat the cartridge and also to keep the outside temperature of the pen lower.

In some implementations, the pen is a "smart pen" with user-friendly technology features. For example, the pen and cartridges can be configured to use RFID to communicate information. For example, the cartridges might have RFID chips that contain information about the product inside the cartridge, such as potency, THC content, CBD content, desired temperatures for distribution, viscosity, plant profile, etc., and the pen would have a built in RFID reader to obtain that information and use it to adjust settings or for other purposes.

In some implementations (with or without the RFID system), the pen will have a built in wireless transceiver (such as Bluetooth, WIFI, or another known wireless transceivers) to communication with a mobile device, computer, or server. In such implementations, a mobile device, computer, or server can be used as a remote system to communicate with the pen. For example, the pen can communicate information about the cartridge (read using the RFID system, the color sensor, or other methods) to the remote system, which will automatically provide dosing instructions or settings back to the pen.

As another example, the pen can communicate information about the cartridge (read using the RFID system, the color sensor, or other methods) to the remote system, and the user's mobile device can display the dosing instructions (along with the information obtained from the cartridge, if desired) on a mobile app visible to the user. The pen can either communicate wirelessly with the mobile device directly (via WIFI, Bluetooth, or other known wireless communication methods), or the information can be relayed from the pen to a server and then from the server to mobile device.

As another example, the server or mobile device (or both) may store profile information related to the user and dosing preferences (or medically prescribed dosing information). When the pen relays information about cartridge to the serve or mobile device, the profile can be used to automatically determine an appropriate dose or "number of button pushes" for the user (depending on the desired treatment or effects), and that information can be relayed to the pen or displayed on the user's mobile device. User profile information may also include identification information, for example a driver's license, passport or other identification information to prove that a user is of legal age for *cannabis* consumption. In some applications, the profile information corresponds to a medical administration record that can be accessed by a user, a doctor, a nurse, or other medical professional. The medical administration record can also be automatically updated after dosing to track user doses. In this way, a single pen can connect with multiple user profiles on a server and/or mobile devices.

As an alternative to the pen reading information about the cartridge from the cartridge (using RFID, the color scanner or other known methods), a user's mobile device can scan information from the cartridge and relay it to the server, to the pen, to the server which relays that information to the pen, or to both the server and the pen.

Also, a particular cartridge can be associated with a specific user profile such that the pen will only be unlocked to distribute drops from that particular cartridge to the specific user.

In some implementations, the OLED screen displays information read using the RFID reader for the user, such as date of origin, potency, or other information described above.

In some applications (such as medical applications), it may be desirable for the pen to be "locked" and require a password or passcode to be entered on a mobile device or a computer and then relayed to the pen in order to unlock the pen for distribution. The password protection is also beneficial in preventing minors from using the pen. The passcode can also be user-specific and cause desired information about the dose or "number of button pushes" to be relayed to the pen or displayed on a mobile device or computer at the same time that the pen is unlocked.

The pen provides a safe, portable, effective, and precise way to distribute a desired amount of rosin, oil, plant-extracted concentrate, or other plant material, including rosin/oil containing THC and/or CBD. No existing system achieves this amount of precision while remaining easy to use and portable. The precise dosing mechanism also eliminates "wasted" product.

In some implementations, a lanyard or pendant (60) is used to carry around cartridges that includes a "lower cap" 62 to prevent leaking and upper cap 64 to snap the cartridges into the lanyard, as shown in the figures.

The figures, block diagrams, and other attachments and explanations provided herewith include additional technical details of the pen, motor, electronics, and other components.

What is claimed is:

1. A method of distributing plant material from a pen comprising:
    (a) displaying, on a display of the pen, information corresponding to a number of button clicks required to engage a heater;
    (b) receiving by a controller, via a button of the pen, the number of button clicks required to engage the heater;
    (c) in response to step (b), the controller engaging the heater to heat the plant material;
    (d) after step (c), displaying, on the display of the pen, information indicating that heating is complete;
    (e) receiving by the controller, via the button of the pen, a number of button clicks required to cause the plant material to be distributed, wherein the number of button clicks required to cause the plant material to be distributed is at least two;
    (f) in response to step (e), the controller driving a spindle with a motor to linearly displace a plunger, wherein the linear displacement of the plunger causes the plant material to be pushed out of a nozzle of the pen.

2. The method of claim 1, further comprising prior to step (a), reading information from a cartridge with an RFID reader of the pen, wherein the information from the cartridge indicates to the controller that plant material stored in the cartridge must be heated prior to being distributed from the pen.

3. The method of claim 1, further comprising reading information from a cartridge with an RFID reader of the pen, wherein the information from the cartridge includes a profile for the plant material stored in the cartridge.

4. The method of claim 3, further comprising providing an audio indication, via a speaker, corresponding to an attribute of the profile.

5. The method of claim 1, further comprising after step (c), displaying a warning on the display relating to the temperature of the pen.

6. The method of claim 1, further comprising after step (f), sensing a current increase in the motor that indicates a cartridge inside of the pen is empty, and in response, the controller causing the motor to reverse its direction.

7. The method of claim 6, further comprising displaying on the display information indicating that the cartridge is empty.

8. The method of claim 6, further comprising providing an audio indication, via a speaker, that the cartridge is empty.

9. The method of claim 1, wherein the plant material is rosin.

10. A pen including a display, a button, a controller, a heater, a motorized spindle, and a nozzle and configured to distribute stored plant material, wherein the controller is configured to:
    (a) cause to be displayed, on the display, information corresponding to a number of button clicks required to engage the heater;
    (b) receive, via the button, the number of button clicks required to engage the heater;
    (c) in response to receiving the number of button clicks required to engage the heater, engage the heater to heat the plant material;
    (d) cause to be displayed, on the display, information indicating that heating is complete;
    (e) receive, via the button, a number of button clicks required to cause the plant material to be distributed, wherein the number of button clicks required to cause the plant material to be distributed is at least two;
    (f) in response to receiving the number of button clicks required to cause the plant material to be distributed, cause the motorized spindle to linearly displace a plunger, wherein the linear displacement of the plunger causes the plant material to be pushed out of the nozzle.

11. The pen of claim 10, wherein the controller is further configured to read information from a cartridge with an RFID reader of the pen, wherein the information from the cartridge indicates to the controller that plant material stored in the cartridge must be heated prior to being distributed from the pen.

12. The pen of claim 10, wherein the controller is further configured to read information from a cartridge with an RFID reader of the pen, wherein the information from the cartridge includes a profile for the plant material stored in the cartridge.

13. The pen of claim 12, wherein the controller is further configured to cause an audio indication, via a speaker, corresponding to an attribute of the profile.

14. The pen of claim 10, wherein the controller is further configured to cause a warning to be displayed on the display relating to the temperature of the pen.

15. The pen of claim 10, wherein the controller is further configured to sense a current increase in the motor that indicates a cartridge inside of the pen is empty, and in response, cause the motor to reverse its direction.

16. The pen of claim 15, wherein the controller is further configured to display on the display information indicating that the cartridge is empty.

17. The pen of claim 15, wherein the controller is further configured to cause an audio indication, via a speaker, that the cartridge is empty.

18. The pen of claim 10, wherein the plant material is rosin.

* * * * *